(12) United States Patent
Katae

(10) Patent No.: US 6,435,527 B1
(45) Date of Patent: Aug. 20, 2002

(54) MECHANISM FOR ADJUSTING TOE ANGLE OF WHEEL AND STEERING APPARATUS

(75) Inventor: Kenichi Katae, Kariya (JP)

(73) Assignee: Kabushiki Kaisha Toyoda Jidoshokki Seisakusho, Kariya (JP)

( * ) Notice: Subject to any disclaimer, the term of this patent is extended or adjusted under 35 U.S.C. 154(b) by 0 days.

(21) Appl. No.: 09/669,871

(22) Filed: Sep. 25, 2000

(30) Foreign Application Priority Data

Sep. 30, 1999 (JP) ............................................ 11-279867

(51) Int. Cl.7 .............................................. B62D 17/00
(52) U.S. Cl. ............................. 280/86.758; 280/93.507
(58) Field of Search ........................ 280/86.75, 86.758, 280/93.51, 93.502, 93.507, 93.508, 93.511, 124.113; 180/440, 435

(56) References Cited

U.S. PATENT DOCUMENTS

| | | | | |
|---|---|---|---|---|
| 2,371,835 A | * | 3/1945 | McNamara | ................. 280/103 |
| 3,498,630 A | * | 3/1970 | Crawford | ................. 280/86.758 |
| 3,982,604 A | * | 9/1976 | Crawford | ..................... 180/435 |
| 4,616,845 A | * | 10/1986 | Pettibone | ............... 280/86.753 |
| 5,121,808 A | * | 6/1992 | Visentini et al. | ............. 180/435 |
| 5,529,316 A | * | 6/1996 | Mattila | ..................... 280/93.51 |
| 6,007,079 A | * | 12/1999 | Kincaid et al. | ......... 280/93.511 |
| 6,047,789 A | * | 4/2000 | Iwanaga | ..................... 180/440 |

FOREIGN PATENT DOCUMENTS

JP  10-76977  3/1998

* cited by examiner

Primary Examiner—J. J. Swann
Assistant Examiner—David R. Dunn
(74) Attorney, Agent, or Firm—Morgan & Finnegan, LLP

(57) ABSTRACT

A toe-angle adjusting mechanism that accurately adjust a toe angle of a wheel. The mechanism includes adjusting pins and a locking plate. The adjusting pins have eccentric shafts and engagement shafts. The locking plate has engaging holes. The locking plate prevents rotation of the adjusting pins by fitting the engaging holes with the engagement shafts.

15 Claims, 6 Drawing Sheets

MECHANISM FOR ADJUSTING TOE ANGLE OF WHEEL AND STEERING APPARATUS

BACKGROUND OF THE INVENTION

The present invention relates to a steering apparatus employed, for example, in industrial vehicles, more specifically to a steering apparatus provided with a toe-angle adjusting mechanism.

Generally, industrial vehicles, such as forklift trucks, are each provided with a steering apparatus for steering a pair of wheels in response to operation of a steering wheel. It is necessary to correctly set the direction of the wheels, or the relationship between the toe angle and the rotational position of the steering wheel, such that the vehicle travels along a straight line when the steering wheel is in the neutral position. However, discordance occurs in the relationship between the toe angle and the rotational position of the steering wheel due to errors in machining various parts of the steering apparatus and assembly errors, which may prevent the vehicles from running smoothly. Therefore, a step of correcting deviation of the toe angle is performed after wheels are attached to the rear axle.

Japanese Unexamined Patent Publication (KOKAI) No. Hei 10-76977 discloses a steering apparatus provided with a toe-angle adjusting mechanism. As shown in FIG. 10, the steering apparatus 71 is located in a rear axle 70 of a vehicle. A pair of steering knuckle arms 74 supporting a pair of rear wheels 76 are pivotally supported by kingpins 79 at the ends of the rear axle 70, respectively. Each rear wheel 76 can be steered together with the steering knuckle arm 74 about the axis of the kingpin 79.

The steering apparatus 71 includes a cylinder 73 having an operating rod 72. The operating rod 72 has connecting pieces extended toward the rear wheels 76, respectively. The pair of steering knuckle arms 74 are connected to the connecting pieces of the operating rod 72 through tie rods 75, respectively. Each tie rod 75 and each steering knuckle arm 74 are connected pivotally relative to each other by a substantially cylindrical connecting shaft 77. The connecting piece of the operating rod 72 and the tie rod 75 are connected pivotally relative to each other by an adjusting pin 78. Axial movement of the operating rod 72 is converted by the tie rod 75 into pivotal movement of the corresponding steering knuckle arm 74 about the kingpin 79.

As shown in FIG. 11, the adjusting pin 78 has a hexagonal head 78$d$, an upper supporting shaft portion 78$b$, an eccentric shaft portion 78$a$ and a lower supporting shaft portion 78$c$. The axis of the eccentric shaft portion 78$a$ (eccentric shaft axis X2) is offset by a predetermined distance, or the offset value T1, from the axis (main axis X1) of the upper and lower supporting shaft portions 78$b$ and 78$c$ and of the hexagonal head 78$d$. The adjusting pin 78 is fitted in an upper pin hole 72$a$ and a lower pin hole 72$b$ formed coaxially in the operating rod 72. The eccentric shaft 78$a$ is abutted only against the inner surface of a collar 80, which is fitted in a pin hole 75$a$ formed in the tie rod 75. The hexagonal head 78$d$ is fitted in a hexagonal hole defined in a locking plate 81. The locking plate 81 is fixed to the operating rod 72 by a bolt 82. The plate 81 prevents rotation of the adjusting pin 78.

In adjusting the toe angle, the locking plate 81 is detached from the hexagonal head 78$d$, and the adjusting pin 78 is turned. The eccentric shaft axis X2 moves along an imaginary circle, the radius of which is the offset value T1, drawn around the main axis X1. The distance between the main axis X1 of the adjusting pin 78 and the axis of the connecting shaft 77 is changed depending on the position of the eccentric shaft axis X2, or the eccentric shaft 78$a$. The position of the knuckle arm 74 depends on this distance. The adjusting pin 78 is locked by fitting the locking plate 81 to the pin 78 after it is adjusted. This fixes the relationship between the wheel 76 and the rotational position of the steering wheel and adjusts the direction, or toe angle, of the rear wheel 76.

In the conventional steering apparatus 71, the locking plate 81 is abutted against a restricting face 72$c$ formed on the operating rod 72 for immobilizing the locking plate 81. This requires a step of forming the restricting face 72$c$ on the operating rod 72.

Variation in the accuracy of parts and errors in assembling them cause variation in the maximum steering angle of the rear wheel 76. If the maximum steering angle is greater than a designed value, the rear wheel 76 can interfere with the body of the vehicle. However, the steering apparatus 71 does not account for errors in the maximum angle of the rear wheel.

Meanwhile, to form the eccentric shaft 78$a$ having a great offset value T1 on the adjusting pin 78 requires a relatively thick adjusting pin 78 and a great amount of machining, which leads to high material costs and much trouble and time.

SUMMARY OF THE INVENTION

A first objective of the present invention is to provide a mechanism for adjusting toe angle of wheels and a steering apparatus that facilitate machining and assembly of an operating rod and connecting pins. A second objective of the present invention is to provide a toe angle adjusting mechanism for a vehicle and a steering apparatus that can accurately adjust the toe angle of a wheel.

To achieve the above objective, the present invention provides a toe-angle adjusting mechanism for adjusting a toe angle of a wheel. The mechanism includes a steering knuckle arm pivotally supporting the wheel, an operating rod, which reciprocates in response to operation of a steering wheel, a tie rod connecting the operating rod with the steering knuckle arm to convert reciprocating movement of the operating rod into a pivotal movement of the steering knuckle arm, an adjusting pin pivotally connecting the operating rod with the tie rod, a connecting pin pivotally connecting the steering knuckle arm with the tie rod, and a locking element fitted against the pins. The adjusting pin includes an eccentric section and an engagement section. An outer surface of the eccentric section contacts either the operating rod or the tie rod. The distance between the operating rod and the steering knuckle arm changes depending on the rotational position of the adjusting pin. The locking element engages the engagement section and the connecting pin to prevent rotation of the adjusting pin.

Other aspects and advantages of the present invention will become apparent from the following description, taken in conjunction with the accompanying drawings, illustrating by way of example the principles of the invention.

BRIEF DESCRIPTION OF THE DRAWINGS

The features of the present invention that are believed to be novel are set forth with particularity in the appended claims. The invention, together with objects and advantages thereof, may best be understood by reference to the following description of the presently preferred embodiments together with the accompanying drawings in which:

DETAILED DESCRIPTION OF THE PREFERRED EMBODIMENTS

The steering apparatus according to a first embodiment of the present invention will be described referring to FIGS. 1 to 6.

Figure 1:
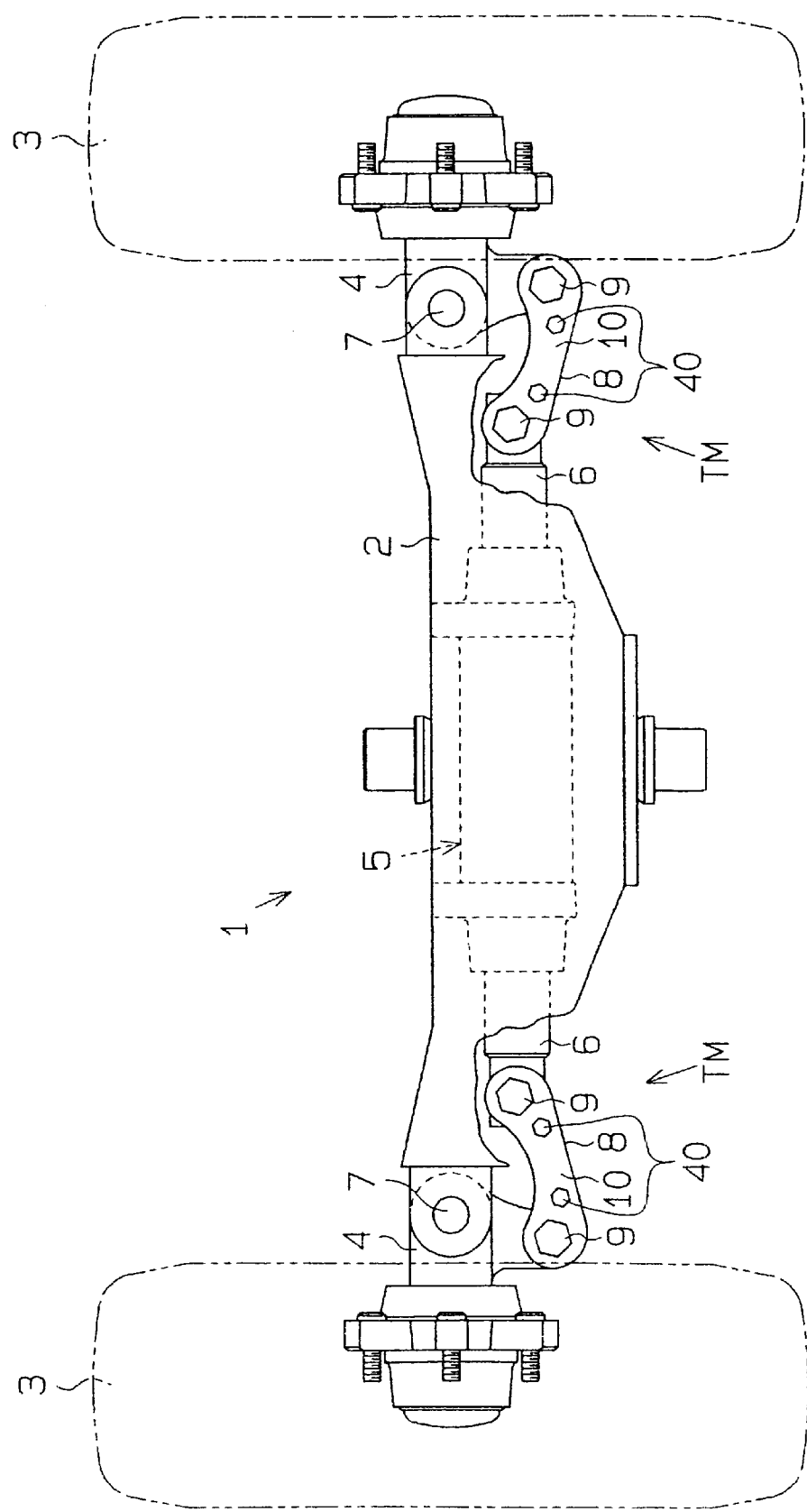
FIG. 1 is a plan view of the steering apparatus according to a first embodiment of the present invention.

The steering apparatus 1 in FIG. 1 is attached to a rear axle beam 2 of an industrial vehicle such as a forklift truck and steers rear wheels 3. The rear axle beam 2 is supported pivotally in the rear part of the vehicle. The rear wheels 3 are attached to the ends of the rear axle beam 2 through steering knuckle arms 4, respectively.

The rear axle beam 2 has at the middle part thereof a hydraulic cylinder 5, or hydraulic actuator. The cylinder 5 has an operating rod 6. The operating rod 6 has ends that extend toward the rear wheels 3, respectively. The cylinder 5 also has a pair of oil chambers and a steering valve (orbiting roll), which are not shown. When an operator operates a steering wheel, the steering valve supplies hydraulic oil to one oil chamber and discharges the oil from the other oil chamber depending on the operating direction of the steering wheel. Thus, the operating rod 6 is moved axially.

Figure 2:
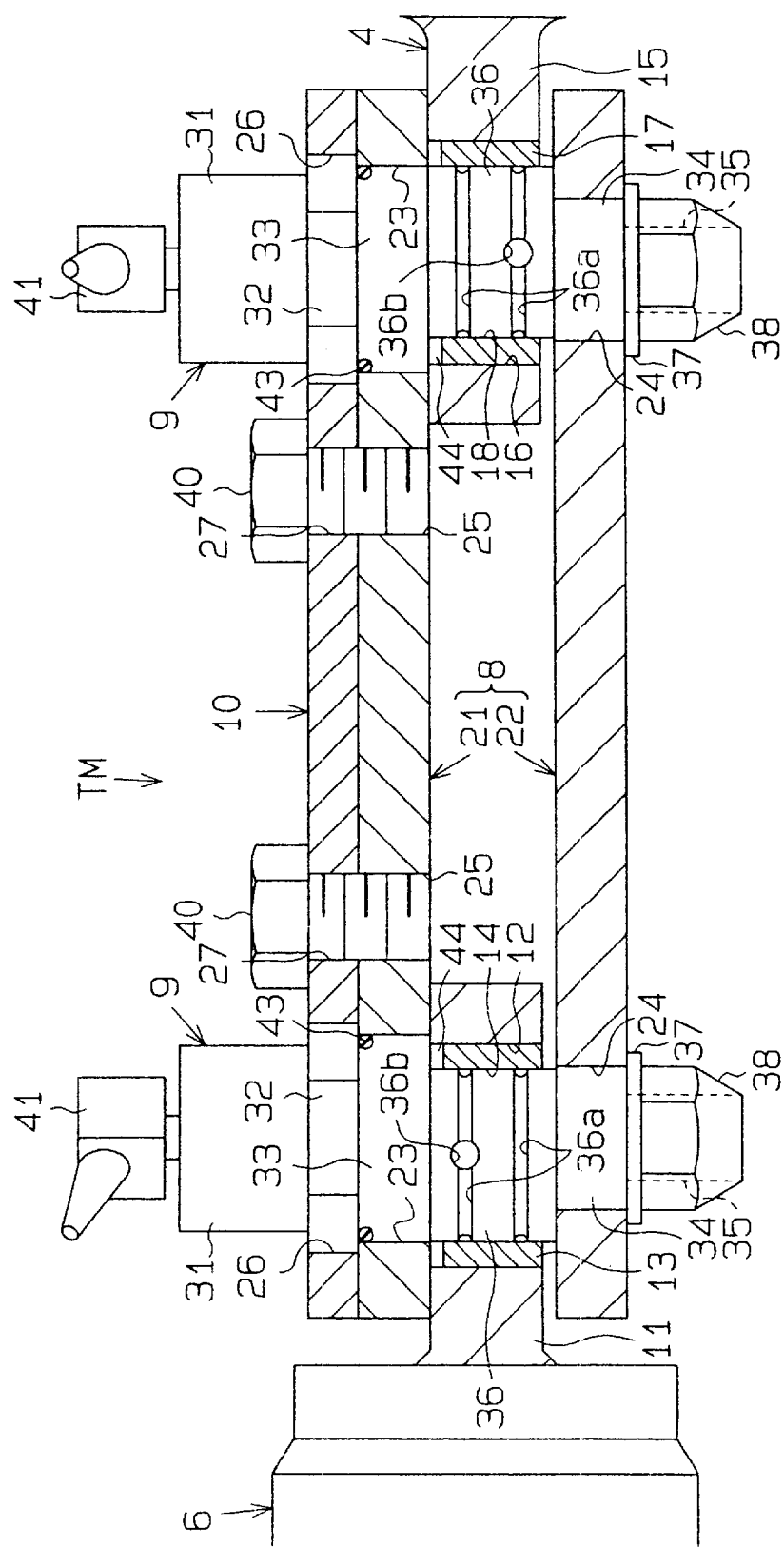
FIG. 2 is a cross-sectional side view of the toe-angle adjusting mechanism.
Figure 3:
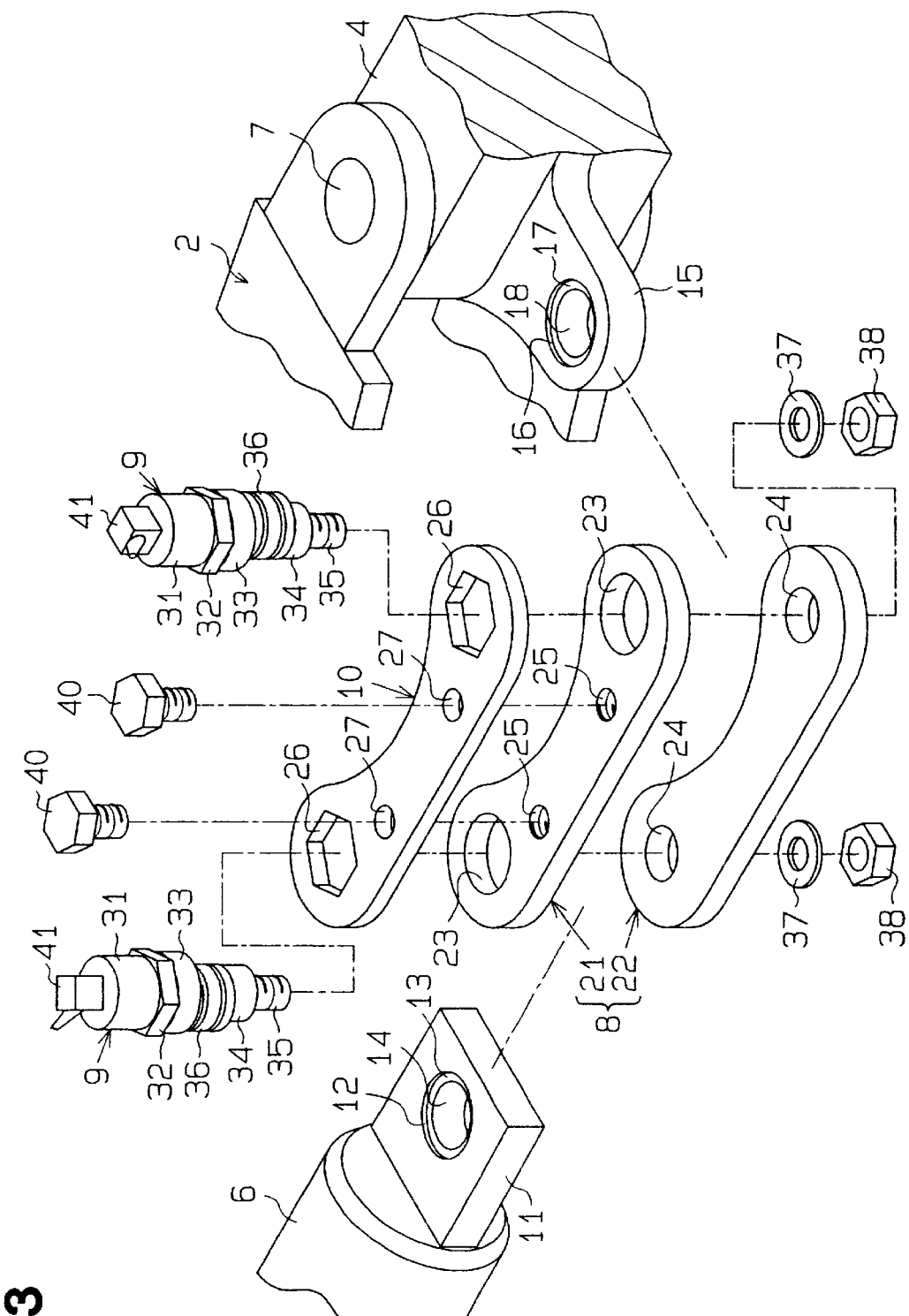
FIG. 3 is an exploded perspective view of the toe-angle adjusting mechanism.

The steering apparatus 1 is provided with a pair of toe-angle adjusting mechanisms TM. In the following description, since the adjusting mechanisms are identical, only the right toe-angle adjusting mechanism TM in FIG. 1 will be described. FIGS. 2 and 3 each show the right toe-angle adjusting mechanism TM.

The right steering knuckle arm 4 is supported by a right kingpin 7 and is pivotal about the right kingpin 7 at the right end of the rear axle beam 2. The right end of the operating rod 6 is connected to the right steering knuckle arm 4 through a right tie rod 8. An inner adjusting pin 9 connects the operating rod 6 with the right tie rod 8, and an outer adjusting pin 9 connects the right tie rod 8 with the right steering knuckle arm 4.

A locking plate 10 is fixed to the upper side of the right tie rod 8 by two bolts 40 to prevent rotation of the two adjusting pins 9.

The axial movement of the operating rod 6 is converted by the tie rod 8 into pivotal movement of the steering knuckle arm 4. Thus, the steering knuckle arm 4 and the rear wheel 3 are moved clockwise or counterclockwise around the kingpin 7. For example, when the operating rod 6 is shifted rightward in FIG. 1, the rear wheels 3 pivot counterclockwise. When the operating rod 6 is shifted leftward, the rear wheels 3 pivot clockwise.

The operating rod 6 has a rod connector 11 formed at its end. The rod connector 11 includes a hole 12 in which a collar 13 is fitted. The inner surface of the collar 13 defines a rod pin hole 14.

The steering knuckle arm 4 has a connecting tongue 15 as shown in FIG. 3. The connecting tongue 15 extends in a direction that is substantially perpendicular to the rear axle beam 2 when wheels 3 are straight. The thickness of the connecting tongue 15 is substantially equal to that of the rod connector 11. The connecting tongue 15, like the rod connector 11, includes a hole 16 in which a collar 17 is fitted. The inner surface of the collar 17 defines a knuckle pin hole 18. The cylinder 5 and the steering knuckle arm 4 are attached to the rear axle beam 2 such that the rod connector 11 and the connecting tongue 15 are in the same plane.

The tie rod 8 consists of an upper tie-rod plate 21 and a lower tie-rod plate 22. The two tie-rod plates 21 and 22 have substantially the same shape. The upper tie-rod plate 21 has a pair of upper tie-rod through holes 23 formed at its ends. The lower tie-rod plate 22 has a pair of lower tie-rod through holes 24 formed at its ends. The lower tie-rod through holes 24 have diameters smaller than those of the upper tie-rod through holes 23. The distance between the centers of the pair of upper tie-rod through holes 23 is substantially equal to that of the lower tie-rod through holes 24. The upper tie-rod plate 21 has two threaded holes 25 formed between the two tie-rod through holes 23.

Figure 5:
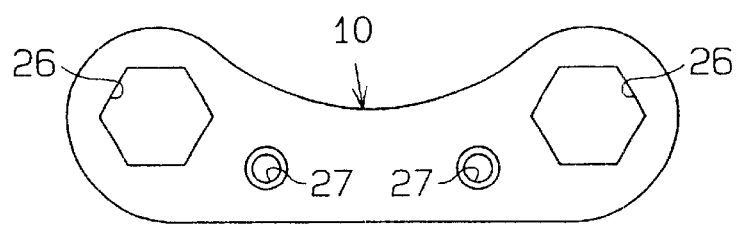
FIG. 5 is a plan view of the locking plate.

As shown in FIGS. 3 and 5, the locking plate 10 has a shape substantially the same as that of the upper and lower tie-rod plates 21 and 22. The locking plate 10 has at its ends a pair of engaging holes 26 (hexagonal in this embodiment), respectively. The pair of engaging holes 26 are coaxial with the upper and lower tie-rod through holes 23 and 24. Further, the locking plate 10 includes a pair of bolt holes 27, which are coaxial with the threaded holes 25 of the upper tie-rod plate 21, respectively.

Figure 4A:
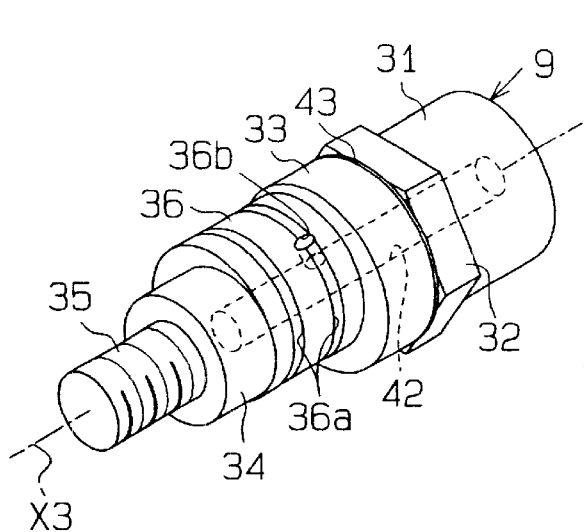
FIG. 4a is a perspective view of the adjusting pin.
Figure 4B:
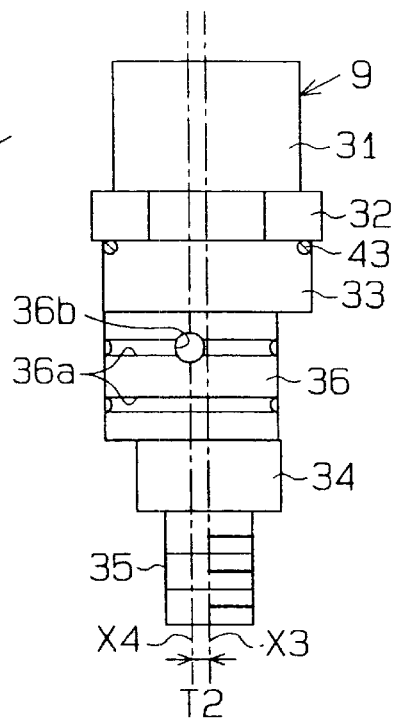
FIG. 4b is a side view of the adjusting pin.

As shown in FIGS. 2 to 4b, the adjusting pins 9 each have a head 31, an engagement shaft 32 (hexagonal in this embodiment), an upper supporting shaft 33, a lower supporting shaft 34, an eccentric shaft 36 and a male-threaded shaft 35. As shown in FIG. 4b, the axis X4 of the eccentric shaft 36 is offset by a predetermined distance, i.e., by the offset value T2, from the main axis X3, which is common to the upper supporting shaft 33, lower supporting shaft 34, head 31, engagement shaft 32 and male-threaded shaft 35.

The diameter of a circle circumscribing engagement shaft 32 is greater than the diameter of the upper supporting shaft 33. The axial position of each adjusting pin 9 is determined by the abutment of the lower end of the engagement shaft 32 against the upper side of the tie-rod plate 21. The axial length of the upper supporting shaft 33 and that of the lower supporting shaft 34 are substantially equal to the thickness of the upper tie-rod plate 21 and that of the lower tie-rod plate 22, respectively. The axial length of the eccentric shaft 36 is substantially equal to the thickness of the rod connector and of the connecting tongue 15.

With regard to the upper supporting shaft 33, lower supporting shaft 34, eccentric shaft 36 and male-threaded shaft 35, the diameters of the upper parts are greater than those of the lower parts. The diameter of the eccentric shaft 36 is such that the eccentric shaft 36 does not extend radially outside of the circumference of the upper supporting shaft 33. Therefore, the two adjusting pins 9 can be fitted respectively in the rod pin hole 14, the upper tie-rod through hole 23 and the lower tie-rod through hole, which are aligned, and also in the knuckle pin hole 18, upper tie-rod through hole 23 and lower tie-rod through 24 which are aligned. When each adjusting pin 9 is fitted in the corresponding through hole, the outer surface of each upper supporting shaft abuts only against the inner surface of the upper tie-rod through hole 23, and the outer surface of the eccentric shaft 36 is abutted only against the inner surface of the rod pin hole 14 and that of the knuckle pin hole 18. Further, the outer surface of the lower supporting shaft 34 abuts only against the inner surface of the lower tie-rod through hole 24.

A nut 38 is attached to each male-threaded shaft 35 through a washer 37, thus preventing the adjusting pin 9 from escaping. Loosening of the nut 38 permits the corresponding adjusting pin 9 to be turned. When the adjusting pin 9 is turned, the corresponding eccentric shaft 36 moves along an imaginary circle, the radius of which is the offset value T2, around the main axis X3. Rotation of the adjusting pin 9 that is associated with the steering knuckle 4 changes the distance between the knuckle pin hole 18 and the outer tie rod through hole 23. Rotation of the outer adjusting pin 9 changes the distance between the rod pin hole 14 and the inner rod through hole 24.

When the operating rod 6 is located in the neutral position, the distance between the rod connector 11 and the knuckle connecting tongue 15 is changed by operating two adjusting pins 9 in the right toe-angle adjusting mechanism TM to change the distance between the centers of the pin holes 14 and 18. Thus, the toe angle of the right rear wheel 3 is adjusted to a set angle. The toe angle of the left rear wheel 3 is adjusted by operating two adjusting pins 9 in the left toe-angle adjusting mechanism TM in the same manner. For example, if the two right adjusting pins 9 are operated to set a long distance between the centers of the pin holes 14 and 18, the right rear wheel 3 is brought into a toe-in state. On the other hand, if the two right adjusting pins 9 are operated to set a short distance between the centers of the pin holes 14 and 18, the right rear wheel 3 is brought into a toe-out state.

After operation of the adjusting pins 9, they are locked using the locking plate 10, as shown in FIG. 2. More specifically, the engaging holes 26 of the locking plate 10 are fitted against the engagement shafts 32 of the adjusting pins 9. Subsequently, the locking plate 10 is fixed to the tie-rod plate 21 using two bolts 40. In the toe-angle adjusting mechanism TM of the first embodiment, the rotational position of each adjusting pin 9 can be set at 60° increments, and the toe angle can be adjusted stepwise depending on the positions of the adjusting pins 9.

A fitting 41 for permitting lubricant to enter is attached to the head 31. As shown in FIG. 4a, a grease channel 42 is defined in each adjusting pin 9 to connect the upper surface of the head 31 to the outer circumference of the eccentric shaft 36. Two circumferential grooves 36a are formed on the outer circumference of the eccentric shaft 36. Grease is contained in the grease channel 42 and is supplied through a grease supply passage 36b to these two circumferential grooves 36a. The grease moves along each circumferential groove 36a to lubricate uniformly around the eccentric shaft 36. The upper supporting shaft 33 has a peripheral groove at the interface with the engagement shaft 32, and an O-ring 43 is fitted in the peripheral groove (see FIGS. 2 and 4).

As shown in FIG. 2, the axial dimension of the rod collar 13 and that of the knuckle collar 17 are less than the axial length of the rod through hole 12 and that of the knuckle through hole 16, respectively. Therefore, as shown in FIG. 2, a grease well 44 is formed over each collar 13 (17). The grease supplied from the grease supply passage 36b to the circumference of the eccentric shaft 36 moves between the two circumferential grooves 36a and the grease well 44 to surround the eccentric shaft 36.

The range of the adjustable toe angle depends on the errors in machining the various parts and the errors in assembling them. Since the toe-angle adjusting mechanism TM adjusts the toe angle using two adjusting pins 9, the offset value T2 of the axis X4 of the eccentric shaft 36 from the main axis X3 is half of the offset value T1 in the prior art, which uses a single adjusting pin.

Figure 6:
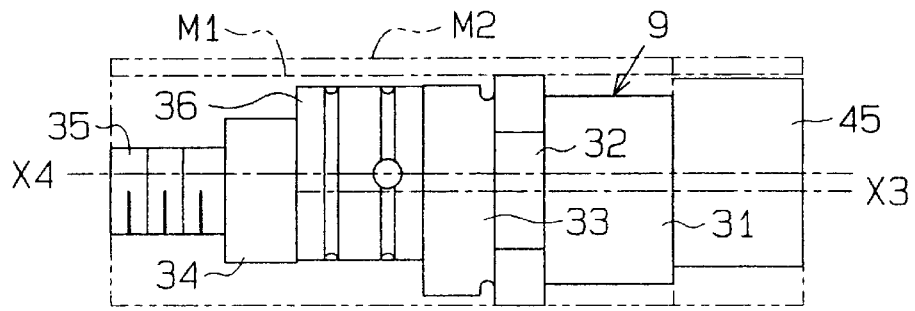
FIG. 6 is a side view showing a process for manufacturing the adjusting pin.

FIG. 6 shows a process for machining an adjusting pin 9 from bar stock (work piece) M1. The work piece is shaped on a lathe to have two axes X3 and X4. More specifically, a head 31 is formed first to have the axis X3, and then a handle 45 to have the axis X4. Thus, the handle 45 is offset with respect to the head 31. Then, the head 31 is gripped to form an upper supporting shaft 33, a lower supporting shaft 34 and a male-threaded shaft 35. The handle 45 is gripped to form an eccentric shaft 36.

Since the offset value T2 of the axis X4 in this adjusting pin 9 is smaller than the offset value T1 in the prior art, a work piece M1 that is thinner than the conventional work piece M2 can be used. Thus, the work piece M1 for the adjusting pin 9 is relatively small, and the material cost is reduced. In addition, since the cutting stock of the work piece is relatively small, the adjusting pin 9 can be machined in a short time.

The distance between the kingpin 7 and the main axis X3 of the adjusting pin 9 can be changed by turning the adjusting pin 9 connecting the steering knuckle arm 4 and the tie rod 8. Thus, the maximum steering angle of the rear wheel 3 can be changed. Therefore, both the toe angle and the maximum steering angle can be adjusted so that the rear wheels 3 do not interfere with the body of the vehicle when the rear wheels 3 are steered to the maximum steering angle.

The first embodiment has the following advantages:

(1) Since a locking plate 10 is fitted against the engagement shafts 32 of two adjusting pins 9, the restricting face 72c in the prior art is not necessary. Thus, the operating rod can be easily formed.

(2) Since the locking plate 10 connects the two adjusting pins 9 to each other, the operating rod 6 and the steering knuckle arm 4 are connected firmly to each other. In other words, the locking plate 10 reinforces the tie rod 8. Therefore, relatively thin upper and lower tie-rod plates 21 and 22 can be used.

(3) The toe angle is adjusted using two adjusting pins 9, the rotational position of which can be adjusted in 60° increments, which enables finer toe angle adjustment.

(4) After adjustment of the two adjusting pins 9, they are locked with a locking plate 10. Thus, the adjusting pins 9 can be locked easily, which facilitates the toe angle adjustment. For example, when the toe angles of the rear wheels 3 are adjusted during maintenance of a vehicle, the locking plates 10 can be detached and attached easily, facilitating adjustment of the adjusting pins 9.

(5) The offset value T2 is about half as much as the offset value T1 in the prior art, so that the adjusting pins 9 can be machined using relatively thin work pieces. In addition, since the work pieces are machined with relatively small cutting stocks, the adjusting pins 9 can be machined in a short time, thus improving productivity.

(6) One adjusting pin 9 connects each steering knuckle arm 4 to the tie rod 8, so that the maximum steering angle of the rear wheel 3 can be adjusted by operating that adjusting pin 9. Therefore, the rear wheel 3 does not interfere with the body of the vehicle, when the rear wheel 3 is steered to the maximum steering angle.

(7) Since the adjusting pin 9 has a hexagonal shaft 32, the rear wheel 3 can be maintained at a desired toe angle. In addition, conventional tools including screw wrench and ratchet can be used for performing toe angle adjustment.

The first embodiment can be modified as follows.

Figure 7:
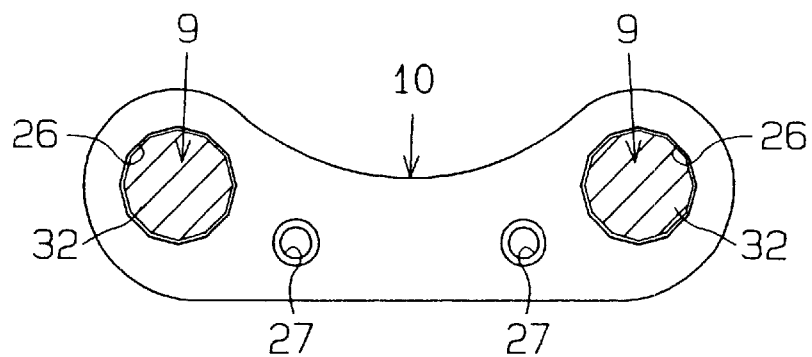
FIG. 7 is a plan view of the locking plate according to a first modification.

The shape of the engaging holes 26 of the locking plate 10 and those of the engagement shafts 32 of the adjusting pins 9 may be changed. For example, as shown in FIG. 7, a locking plate 10 containing regular dodecagonal holes 26 and adjusting pins 9 each having a regular dodecagonal shaft 32 may be used. In this case, the toe angle can be adjusted more finely. The engaging holes 26 and the engagement shafts 32 may be formed to have other regular polygonal shapes including regular triangular shapes, regular tetragonal shapes, regular pentagonal shapes, regular heptagonal shapes, regular octagonal shapes, regular nonagonal shapes, regular decagonal shapes, regular undecagonal shapes, regular tridecagonal shapes or the like. The more the angles in the engaging holes 26 and in the engagement shafts 32, the finer the toe angle adjustment. Meanwhile, the fewer angles in the engaging holes 26 and in the engagement shafts 32, the more secure the locking of the adjusting pins 9.

Figure 8:
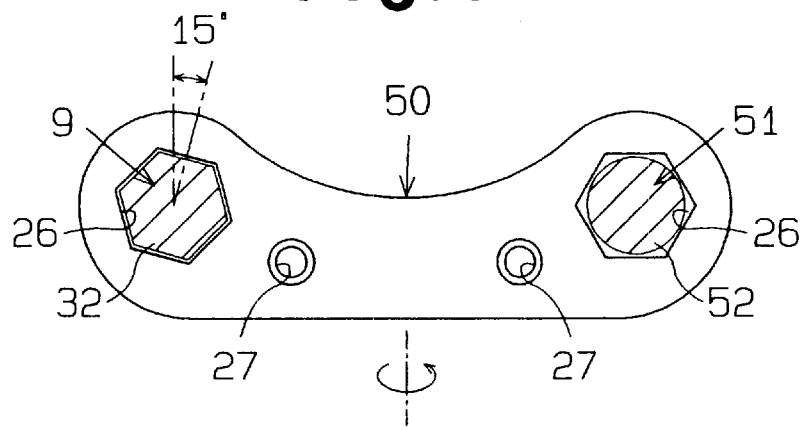
FIG. 8 is a plan view of the locking plate according to a second modification.

Adjusting pins 9 may be used for connecting the operating rod 6 with the tie rod 8 and for connecting the steering knuckle arm 4 with the tie rod 8. For example, as shown in FIG. 8, the adjusting pin 9 may be used only for connecting the operating rod 6 with the tie rod 8. In this case, a connecting pin 51 having neither eccentric shaft nor an engagement shaft 32 is used for connection of the steering knuckle arm 4 with the tie rod 8. More specifically, a cylindrical shaft 52 of the connecting pin 51 contacts the surface of one hexagonal hole 26 (the right hole in FIG. 8) of the locking plate 50. By fitting the locking plate 50 to the adjusting pin 9 and the connecting pin 51, the adjusting pin 9 is locked. Here, it is also possible to form a polygonal (e.g., hexagonal) fitting section on the conventional connecting pin 51 and to fit it in the hexagonal hole 26 to lock the plate 50.

Two hexagonal engaging holes 26 may be formed in the locking plate 50 in FIG. 8 and oriented asymmetrically about a plane that bisects and is perpendicular to a line that connects the centers of the holes 26. More specifically, the left hexagonal engaging hole 26 in FIG. 8 is turned by 15° (¼ of the adjusting pitch 60°) with respect to the right hexagonal engaging hole 26. The locking plate 50 is designed to be used reversibly to add another six variations of the locking position of the adjusting pin 9, thus enabling fine toe angle adjustment. The locking plate 50 is reversed by rotating it about the line indicated in FIG. 8.

The locking plate 50 in FIG. 8 may be used in place of the locking plate 10 of the first embodiment.

Figure 9:
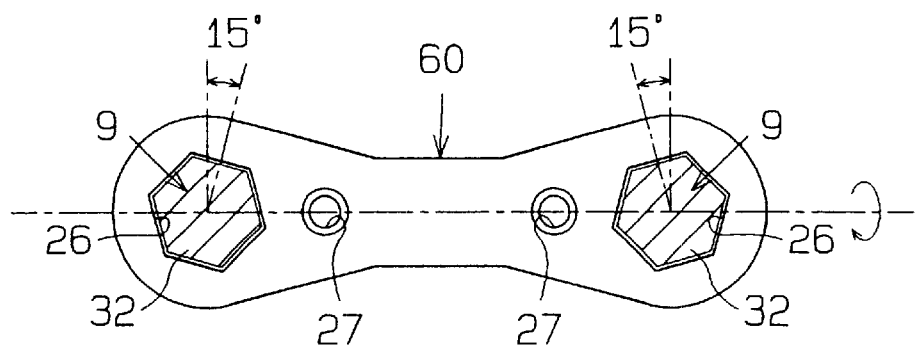
FIG. 9 is a plan view of the locking plate according to a third modification.
Figure 10:
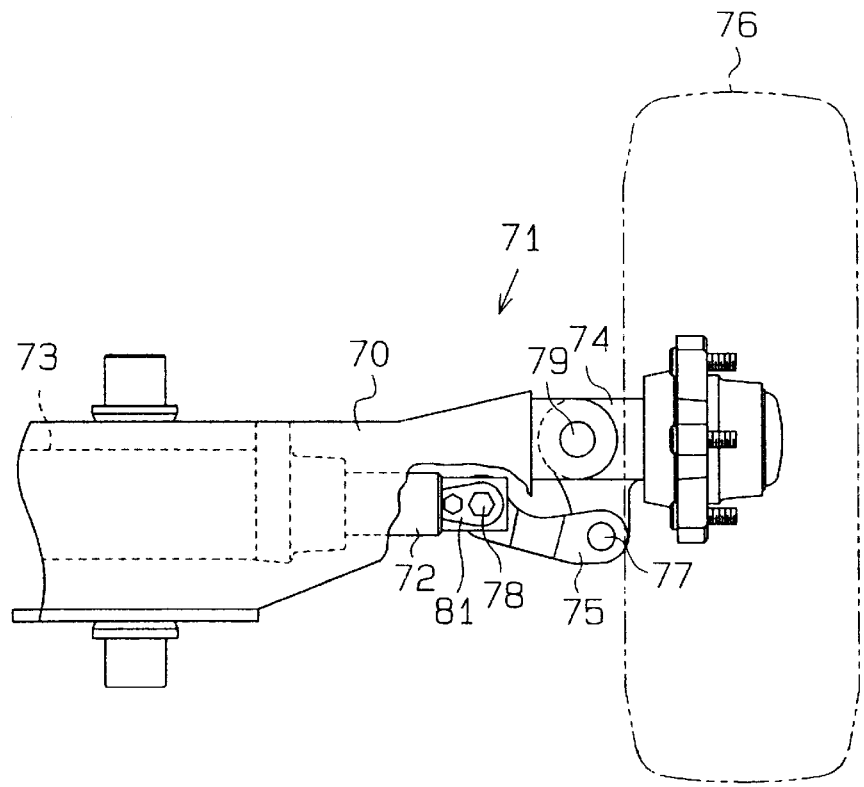
FIG. 10 is a plan view showing the conventional steering apparatus.
Figure 11:
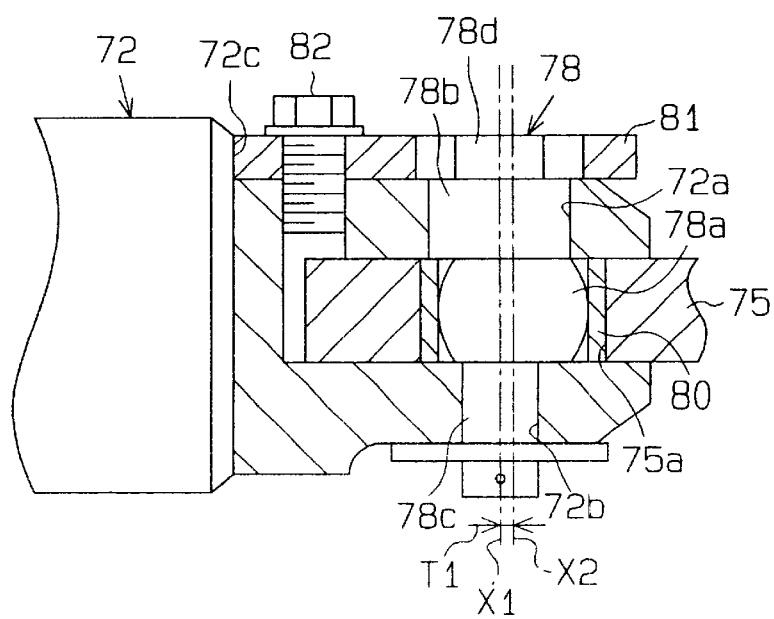
FIG. 11 is an enlarged cross-sectional view of the toe-angle adjusting mechanism in the steering apparatus shown in FIG. 10.

A locking plate 60 shown in FIG. 9 may be used in place of the locking plate 10 of the first embodiment. When the locking plate 60 is reversed by rotating it 180° about the longitudinal axis as indicated in FIG. 9, the positions of the angles in each hexagonal hole 26 do not coincide with the original positions but are staggered by 15°. Use of this locking plate 60 provides 12 variations of the locking position of the adjusting pin, thus enabling fine toe angle adjustment. The polygonal holes 26 are asymmetrical with respect to a plane that includes the centers of the holes 26. The plane is represented by a broken line in FIG. 9.

The shape of each engaging hole 26 of the locking plate 10 and that of the engagement shaft of each adjusting pin 9 are not limited to polygonal shapes. For example, a gear-like engagement shaft may be formed on the adjusting pin 9, and a hole having a shape matching the engagement shaft is formed in the locking plate 10. This can achieve fine toe angle adjustment more precisely and securely prevents rotation of the adjusting pin 9.

Polygonal recesses may be formed in place of the engaging holes 26 (hexagonal holes 26) in the locking plate 10. In this case, a polygonal engagement shaft is formed at the head of each adjusting pin 9, and the polygonal head is fitted in the recess of the locking plate 10 to lock the adjusting pin 9.

Polygonal protrusions may be formed on the locking plate 10, while a polygonal engaging hole (or recess) may be formed in each adjusting pin 9.

Contact between the adjusting pin 9 and the locking plate 10 is not limited to inter-fitting but may be other kids of engagement. For example, it is possible to form a positioning groove on the circumference of the adjusting pin 9, while claws engageable with the positioning groove may be formed on the locking plate 10.

The steering apparatus 1 may be mounted on industrial vehicles other than forklift trucks and vehicles other than industrial vehicles.

It should be apparent to those skilled in the art that the present invention may be embodied in many other specific forms without departing from the spirit or scope of the invention. Therefore, the present examples and embodiments are to be considered as illustrative and not restrictive and the invention is not to be limited to the details given herein, but may be modified within the scope and equivalence of the appended claims.

What is claimed is:

1. A toe-angle adjusting mechanism for adjusting a toe angle of a wheel, the mechanism comprising:

a steering knuckle arm pivotally supporting the wheel;

an operating rod, which reciprocates in response to operation of a steering wheel;

a tie rod connecting the operating rod with the steering knuckle arm to convert reciprocating movement of the operating rod into a pivotal movement of the steering knuckle arm;

a first pin pivotally connecting the operating rod with the tie rod, the first pin including an eccentric section, a supporting shaft and an engagement section, wherein the eccentric section and the supporting shaft contact their corresponding operating rod and tie rod, the distance between the operating rod and the steering knuckle arm being changed depending on the rotational position of the first pin;

a second pin pivotally connecting the steering knuckle arm with the tie rod, wherein the second pin includes an eccentric section, a supporting shaft and an engagement section, wherein the eccentric section and the supporting shaft contact the steering knuckle arm and the tie rod, and the distance between the operating rod and the steering knuckle arm depends on the rotational position of the second pin; and a locking element fitted against the first and second connecting pins, wherein the locking element engages the engagement section and the second connecting pin to prevent rotation of the first pin.

2. The mechanism according to claim 1, wherein the locking element includes a locking plate having a first structure that engages the engagement section of the first pin and a second structure that engages the engagement section of the second pin, and wherein the first and second pins are prevented from rotating due to engagement of the first and second structures with the engagement sections, respectively.

3. The mechanism according to claim 2, wherein the engagement section of the first pin includes a polygonal shaft, and the first structure includes a polygonal hole.

4. The mechanism according to claim 2, wherein the engagement section of the second pin includes a polygonal shaft, and the second structure includes a polygonal hole.

5. The mechanism according to claim 1, wherein the locking element includes a locking plate that has a first polygonal hole that engages with the engagement section of the first pin and a second polygonal hole that engages with the second pin, and wherein the corners of the first polygonal hole are located at angular positions that differ from those of the second polygonal hole with respect to a plane perpendicular to an imaginary line that connects the centers of the polygonal holes.

6. The mechanism according to claim 1, wherein the locking element includes a locking plate that has a first polygonal hole and a second polygonal hole, and the locking plate can lock the first and second pins in either a first position or a second position, wherein the second position differs from the first position by 180° of rotation about the longitudinal axis, wherein the centers of the first and second polygonal holes are on the longitudinal axis, and each polygonal hole is asymmetrical with respect to the longitudinal axis, wherein the engagement section of the first pin and the engagement section of the second pin each include a polygonal shaft matching the polygonal holes, wherein the polygonal shafts and the polygonal holes permit arrangement of the first and second pins in predetermined rotational positions.

7. The mechanism according to claim 1, wherein the second pin has a grease chamber and a grease supply passage connecting the chamber to the outer surface of the eccentric section of the second pin.

8. The mechanism according to claim 1, wherein the first pin has a grease chamber and a grease supply passage connecting the chamber to the outer surface of the eccentric section of the first pin.

9. The mechanism according to claim 8, wherein one of the operating rod or the tie rod is provided with a collar that contacts the outer surface of the eccentric section, wherein the axial dimension of the collar is less than the axial length of the eccentric section, and wherein the eccentric section and the collar define a grease well.

10. A toe-angle adjusting mechanism for adjusting a toe angle of a wheel, the mechanism comprising:
a steering knuckle arm pivotally supporting the wheel, the arm being pivotal together with the wheel and the steering knuckle arm, wherein the knuckle arm includes a knuckle pin hole;
an operating rod, which reciprocates in response to operation of a steering wheel, the operating rod having a rod pin hole;
a tie rod connecting the operating rod with the steering knuckle arm to convert reciprocating movement of the operating rod into pivotal movement of the steering knuckle arm, the tie rod having a first tie-rod pin hole and a second tie-rod pin hole;
a first adjusting pin fitted in the rod pin hole and the first tie-rod pin hole to connect the operating rod with the tie rod, wherein the first adjusting pin has an eccentric section and a polygonal section, wherein the eccentric section of the first adjusting pin contacts only the inner surface of the rod pin hole;
a second adjusting pin fitted in the knuckle pin hole and the second tie-rod pin hole to connect the steering knuckle arm with the tie rod, wherein the second adjusting pin has an eccentric section and a polygonal section, and the eccentric section of the second adjusting pin contacts only the inner surface of the knuckle pin hole; and
a locking plate for preventing rotation of the first and second adjusting pins, wherein the locking plate includes a first polygonal hole and a second polygonal hole, which are fitted on the first polygonal section and the second polygonal section, respectively.

11. The mechanism according to claim 10, wherein the corners of the first polygonal hole are located at angular positions that differ from those of the second polygonal hole with respect to a plane perpendicular to an imaginary line that connects the centers of the polygonal holes.

12. The mechanism according to claim 10, wherein the locking plate has a longitudinal axis and can lock the adjusting pins in a first position and a second position, wherein the second position differs from the first position by 180° of rotation about the longitudinal axis, and the centers of the first and second polygonal holes are on the longitudinal axis, wherein each polygonal hole is asymmetrical with respect to the longitudinal axis.

13. The mechanism according to claim 10, wherein the first and second adjusting pins each have a grease chamber and a grease supply passage connecting the chamber to the outer surface of the eccentric section.

14. The mechanism according to claim 10 further comprising a first collar fitted one of the knuckle pin hole and the rod pin hole, wherein the collar contacts the outer surface of the eccentric section of the first adjusting pin, wherein the axial dimension of the first collar is less than the axial length of the eccentric section of the first adjusting pin, and wherein the first eccentric shaft and the first collar define a grease well.

15. A vehicular steering apparatus comprising:
a hydraulic actuator for reciprocating an operating rod in response to operation of a steering wheel;
an axle beam supporting the actuator;
a steering knuckle arm pivotally supported at an end of the axle beam, wherein the knuckle arm supports a wheel;
a tie rod connecting an end of the operating rod with the steering knuckle arm to convert reciprocating movement of the operating rod to pivotal movement of the steering knuckle arm;
a first pin pivotally connecting the operating rod with the tie rod, the first pin including an eccentric section, a supporting shaft and an engagement section, wherein the eccentric section and the supporting shaft contact the operating rod and the tie rod, wherein the distance between the operating rod and the steering knuckle arm is changed depending on the rotational position of the first pin;
a second pin pivotally connecting the steering knuckle arm with the tie rod, the second pin including an eccentric section, a supporting shaft and an engagement section, wherein the eccentric section and the supporting shaft contact their corresponding steering knuckle arm and tie rod, wherein the distance between the operating rod and the steering knuckle arm depends on the rotational position of the second pin; and
a locking element fitted against the first and second connecting pins to engage with the engagement section of the first pin and the second pin to prevent rotation of the first pin.

* * * * *